(12) United States Patent
Strandborg (10) Patent No.: US 12,341,948 B1
(45) Date of Patent: Jun. 24, 2025

(54) COMPENSATING FOR OPTICAL COMBINER CURVATURE

(71) Applicant: Distance Technologies Oy, Helsinki (FI)

(72) Inventor: Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/068,107

(22) Filed: Mar. 3, 2025

Related U.S. Application Data (63) Continuation-in-part of application No. 18/630,182, filed on Apr. 9, 2024.

(51) Int. Cl.
| | | |
|---|---|---|
| *H04N 13/327* | (2018.01) | |
| *H04N 13/139* | (2018.01) | |
| *H04N 13/15* | (2018.01) | |
| *H04N 13/324* | (2018.01) | |
| *H04N 13/383* | (2018.01) | |
| *H04N 13/398* | (2018.01) | |

(52) U.S. Cl.
CPC ......... *H04N 13/327* (2018.05); *H04N 13/139* (2018.05); *H04N 13/15* (2018.05); *H04N 13/324* (2018.05); *H04N 13/383* (2018.05); *H04N 13/398* (2018.05)

(58) Field of Classification Search
CPC .... H04N 13/327; H04N 13/139; H04N 13/15; H04N 13/324; H04N 13/383; H04N 13/398
USPC ......................................................... 348/51
See application file for complete search history.

(56) References Cited

U.S. PATENT DOCUMENTS

| | | | | |
|---|---|---|---|---|
| 10,554,940 | B1* | 2/2020 | Ghazaryan | H04N 9/3188 |
| 12,092,830 | B1* | 9/2024 | Guo | G02F 1/133638 |
| 12,196,960 | B1* | 1/2025 | Konttori | G02B 27/0101 |
| 2006/0268407 | A1* | 11/2006 | Fergason | H04N 13/346 |
| | | | | 359/485.02 |
| 2016/0014403 | A1* | 1/2016 | Stroetmann | G06F 1/1681 |
| | | | | 348/53 |
| 2016/0278695 | A1* | 9/2016 | Wang | A61B 34/25 |
| 2018/0120567 | A1* | 5/2018 | Cobb | G02B 27/0172 |
| 2019/0285883 | A1* | 9/2019 | Cui | G02B 27/1066 |
| 2020/0033613 | A1* | 1/2020 | Konttori | G02B 27/0172 |
| 2021/0258549 | A1* | 8/2021 | Ghazaryan | H04N 9/3105 |

(Continued)

*Primary Examiner* — Tung T Vo
(74) *Attorney, Agent, or Firm* — Ziegler IP Law Group LLC.

(57) ABSTRACT

For a given region of a light-emitting surface of a display unit, an iterative search is performed to find a corresponding reflection portion of a semi-reflective surface of an optical combiner where light rays emanating from the given region are incident and from which the light rays reflect towards a given eye, based on a curvature of the semi-reflective surface, a relative location of the semi-reflective surface with respect to the light-emitting surface, and the relative location of the given eye with respect to the semi-reflective surface. A viewing direction from the given eye towards the corresponding reflection portion is determined. A corresponding pixel location in the input image is determined based on the viewing direction. For the corresponding pixel location in the input image, colour values of a corresponding pixel in the input image are fetched and utilised to display colour at the given region of the light-emitting surface.

18 Claims, 5 Drawing Sheets

(56) References Cited

U.S. PATENT DOCUMENTS

| | | | |
|---|---|---|---|
| 2022/0013088 A1* | 1/2022 | Kikuta | G09G 3/003 |
| 2022/0078398 A1* | 3/2022 | Mok | H04N 13/32 |
| 2022/0350146 A1* | 11/2022 | Hua | G02B 27/1026 |
| 2022/0382060 A1* | 12/2022 | Sato | G02F 1/13718 |
| 2022/0397862 A1* | 12/2022 | Karafin | H04N 13/346 |
| 2023/0228997 A1* | 7/2023 | Xiao | G02B 27/0172 |
| | | | 359/630 |
| 2024/0001761 A1* | 1/2024 | Dehkordi | B60K 35/00 |

\* cited by examiner

COMPENSATING FOR OPTICAL COMBINER CURVATURE

CROSS-REFERENCE TO RELATED APPLICATIONS

This application is a continuation-in-part of U.S. patent application Ser. No. 18/630,182, titled "DISPLAY CURVATURE COMPENSATION BASED ON RELATIVE LOCATION OF USER" and filed on Apr. 9, 2024, which is incorporated herein by reference.

TECHNICAL FIELD

The present disclosure relates to systems incorporating compensation for an optical combiner's curvature. The present disclosure also relates to methods incorporating compensation for an optical combiner's curvature.

BACKGROUND

Glasses-free augmented reality (AR) systems often utilize a semi-reflective optical combiner to reflect images from a display toward a user's eyes. The display itself may be either flat or curved, and the optical combiner can take various shapes, including complex curved surfaces such as a vehicle windshield. In such systems, a location and shape of a reflected image depend on a position of a given eye relative to the display and the optical combiner.

When the optical combiner is curved, predicting how the displayed image appears to a given eye becomes challenging. While it is trivial to calculate a location on a semi-reflective surface of the optical combiner where a given eye ray (along a viewing direction from the position of the given eye) intersects, using basic ray tracing and reflection principles, finding a solution to the inverse problem—determining what should be displayed so that the given eye perceives an undistorted image—is significantly more complex.

This difficulty arises because a mapping between display pixels and their reflection locations on the semi-reflective surface is not bijective. Depending on the configuration of the display, the eye's position relative to the optical combiner and the display, and a curvature of the semi-reflective surface, a given pixel on the display may:
  not appear at all in the reflection,
  appear at exactly one location on the semi-reflective surface, or
  be reflected from multiple locations on the semi-reflective surface.

Especially, regarding the third point above, at certain regions of the combiner (for example, at the extreme edges), the reflection may become degenerate, meaning that a single display pixel may be reflected from multiple locations on the semi-reflective surface. As a result, the perceived image may be highly warped and distorted, making it difficult to produce clear and stable augmented content.

Therefore, in light of the foregoing discussion, there exists a need to overcome the aforementioned challenge.

SUMMARY

The present disclosure seeks to provide a system and a method that is capable of compensating for an optical combiner's curvature. The aim of the present disclosure is achieved by a system and a method that perform an iterative search to find a mapping between display pixels and their reflection locations on a semi-reflective surface of an optical combiner, and generate an output image to be displayed, such that after reflection from the semi-reflective surface, a given eye perceives an undistorted image aligned with its perspective, thereby compensating for distortions caused by the combiner's curvature, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  a tracker;
  a display unit;
  an optical combiner arranged on an optical path of the display unit, wherein a semi-reflective surface of the optical combiner is curved; and at least one processor configured to:
    determine a relative location of eyes of at least one user with respect to the semi-reflective surface of the optical combiner, by utilising the tracker;
    determine a relative pose of an imaginary image plane on which an input image is to be presented with respect to a given eye of an individual one of the at least one user, based on a relative location of the given eye with respect to the semi-reflective surface;
    generate or retrieve the input image to be presented to the given eye, based on the relative pose of the imaginary image plane with respect to the given eye;
    for a given region of a light-emitting surface of the display unit, perform an iterative search to find a corresponding reflection portion of the semi-reflective surface where light rays emanating from the given region of the light-emitting surface are incident and from which the light rays reflect towards the given eye, based on a curvature of the semi-reflective surface, a relative location of the semi-reflective surface with respect to the light-emitting surface, and the relative location of the given eye with respect to the semi-reflective surface; and when the corresponding reflection portion of the semi-reflective surface is found during the iterative search,
determine a viewing direction from the given eye towards the corresponding reflection portion of the semi-reflective surface of the optical combiner, based on the relative location of the given eye with respect to the semi-reflective surface and a position of the corresponding reflection portion on the semi-reflective surface;
determine a corresponding pixel location in the input image, based on the viewing direction from the given eye towards the corresponding reflection portion of the semi-reflective surface and the relative pose of the imaginary image plane with respect to the given eye;
for the corresponding pixel location in the input image, fetch colour values of a corresponding pixel in the input image; and
utilise the colour values of the corresponding pixel in the input image to display colour at the given region of the light-emitting surface of the display unit.

In a second aspect, an embodiment of the present disclosure provides a method comprising:
determining a relative location of eyes of at least one user with respect to a semi-reflective surface of an optical combiner, the optical combiner being arranged on an optical path of a display unit;
determining a relative pose of an imaginary image plane on which an input image is to be presented with respect to a given eye of an individual one of the at least one user, based on a relative location of the given eye with respect to the semi-reflective surface;
generating or retrieving the input image to be presented to the given eye, based on the relative pose of the imaginary image plane with respect to the given eye;
for a given region of a light-emitting surface of the display unit, performing an iterative search to find a corresponding reflection portion of the semi-reflective surface where light rays emanating from the given region of the light-emitting surface are incident and from which the light rays reflect towards the given eye, based on a curvature of the semi-reflective surface, a relative location of the semi-reflective surface with respect to the light-emitting surface, and the relative location of the given eye with respect to the semi-reflective surface; and
when the corresponding reflection portion of the semi-reflective surface is found during the iterative search,
determining a viewing direction from the given eye towards the corresponding reflection portion of the semi-reflective surface of the optical combiner, based on the relative location of the given eye with respect to the semi-reflective surface and a position of the corresponding reflection portion on the semi-reflective surface;
determining a corresponding pixel location in the input image, based on the viewing direction from the given eye towards the corresponding reflection portion of the semi-reflective surface and the relative pose of the imaginary image plane with respect to the given eye;
for the corresponding pixel location in the input image, fetching colour values of a corresponding pixel in the input image; and
utilising the colour values of the corresponding pixel in the input image to display colour at the given region of the light-emitting surface of the display unit.

The present disclosure provides the aforementioned system and the aforementioned method incorporating compensation for the curvature of the optical combiner, based on the relative location of the eyes of the at least one user. The disclosed system provides a precise and adaptive approach for rendering images through a curved, semi-reflective optical combiner, ensuring that displayed images appear undistorted and correctly aligned to the user's perspective. Unlike conventional display systems that assume a static optical path, this system dynamically accounts for the user's eye location, the curvature of the semi-reflective surface of the optical combiner, and the geometry of the display unit. This leads to significant improvements in image fidelity, alignment, and clarity.

By tracking the user's eyes and determining the relative pose of an imaginary image plane, the system ensures that input images are generated or retrieved with an appropriate perspective transformation. This enables accurate projection of augmented reality (AR) content even when the relative location of the user's eyes changes, making it particularly useful for applications such as head-up displays (HUDs), automotive AR systems, and immersive display technologies.

A key technical advantage of this system is the iterative search used to find the correct reflection portion on the semi-reflective surface where light rays emanating from a particular region of the light-emitting surface are incident and from which the light rays reflect towards the given eye. Traditional methods rely on precomputed or approximate mappings, which can introduce misalignment, distortions, or limited adaptability to changes in the location of the user's eye. In contrast, this system iteratively refines the search, based on the curvature of the semi-reflective surface and the user's eye location, allowing for real-time correction of optical distortions. This iterative search provides a more precise mapping between display regions and their corresponding reflection portions on the semi-reflective surface, minimizing artifacts such as ghosting or warping that commonly occur in curved optical systems.

Another critical technical benefit is the pixel-wise colour adaptation. Once the correct reflection portion is identified, the system determines the viewing direction from the given eye to the correct reflection portion of the semi-reflective surface and calculates the exact pixel location in the input image that should be displayed at the given region of the light-emitting surface. By fetching the correct colour values from the input image and applying them to the corresponding display pixels, the system ensures that the perceived image is geometrically and photometrically accurate, eliminating distortions caused by the optical combiner's curvature.

For illustration purposes, there will now be described how the aforementioned technical benefits can be achieved. The at least one processor performs the following steps:

1. The relative pose of the imaginary image plane on which the input image is to be presented with respect to the given eye is determined based on the relative location of the given eye with respect to the semi-reflective surface. The imaginary image plane represents the perceived location of at least one virtual object (namely, AR content) from the user's perspective, simulating the position where the input image should appear in the user's field of view. Optionally, in this regard, the at least one processor is configured to determine a region on the semi-reflective surface from which the light rays emitted by the light-emitting surface are reflected toward the given eye, based on:

the relative location of the given eye with respect to the semi-reflective surface, a position, orientation, size and curvature of the semi-reflective surface, and a position, orientation, size and curvature of the light-emitting surface.

A shape of this region on the semi-reflective surface corresponds to a view frustum within which the at least one virtual object is presented to the user. The relative pose of the imaginary image plane can be determined based on the determined region on the semi-reflective surface, ensuring proper perspective projection.

It will be appreciated that the light-emitting surface could be flat or curved; when the light-emitting surface is flat, it is considered to have a zero curvature. It will also be appreciated that the semi-reflective surface and optionally, the light-emitting surface could have varying curvature radii in different directions; moreover, the curvature could be different at different parts of the semi-reflective surface and optionally, the light-emitting surface.

2. The input image to be presented to the given eye is generated or retrieved, based on the relative pose of the imaginary image plane with respect to the given eye. The term "input image" refers to an undistorted image as it is intended to be shown to the user's eye. The input image can be in a form of a perspective projection, or a flat two-dimensional (2D) rectangle in a 3D space. In this regard, the input image could be adjusted in real-time or near real-time using at least one of:

perspective transformation matrices to match an orientation of the imaginary image plane;

at least one depth correction algorithm to ensure proper scaling and positioning.

In order to perform the step of determining the relative pose of the imaginary image plane and the step of generating or retrieving the input image, the system leverages real-time tracking, geometric transformations, and optical modelling. This ensures that the input image is correctly aligned for accurate projection through the semi-reflective surface, resulting in an undistorted and perspective-correct AR display.

3. For the given region of the light-emitting surface, the iterative search is performed to find the corresponding reflection portion of the semi-reflective surface where light rays emanating from the given region of the light-emitting surface are incident and from which the light rays reflect towards the given eye. The term "reflection portion" could refer to a reflection point or to a slightly larger region having several points whose average curvature and distance from the display unit is the same. In this regard, the corresponding reflection can be found, based on:

(i) Curvature of the Semi-Reflective Surface:

The curvature of the semi-reflective surface can be pre-determined as a curvature model of the semi-reflective surface. The curvature model can be represented as at least one of: a heightfield, a parametric equation, or a mesh-based model. A surface normal at any given point on the semi-reflective surface can be derived from this curvature model, influencing how light reflects.

As an example, for a flat light-emitting surface, the curvature of the semi-reflective surface can be pre-determined in a form of a heightfield that is oriented along the light-emitting surface, such that Z=0 in the heightfield aligns with the light-emitting surface, and an X-axis and a Y-axis of the heightfield align with an X-axis and a Y-axis of the light-emitting surface, with its origin at a centre of the light-emitting surface. Optionally, the heightfield extends beyond boundaries of the light-emitting surface, to allow for wider viewing angles. As an example, a size of the heightfield may be 1.5 times a size of the light-emitting surface. As another example, the heightfield can be extended to cover an entirety of the semi-reflective surface. For each pixel on the light-emitting surface, a mapping point on the semi-reflective surface is searched along a Z-axis of the light-emitting surface. If the mapping point is found, the surface normal at the mapping point is stored in R, G and B components of the heightfield, and a distance of the mapping point from said pixel on the light-emitting surface is stored in an alpha component of the heightfield. A special value, for example, such as (1000, 1000, 1000, 0), can be used to mark locations where no corresponding mapping point is found on the semi-reflective surface. Such a large value could be selected, so that even after bilinear texture sampling, it can be detected whether any of the four components of the heightfield lie outside the boundaries of the semi-reflective surface.

(ii) Relative Location of the Semi-Reflective Surface with Respect to the Light-Emitting Surface:

Pre-calibrated spatial data can be used to determine how the semi-reflective surface and the light-emitting surface are positioned relative to each other. This data can be stored in transformation matrices that allow accurate coordinate mapping between the light-emitting surface and the semi-reflective surface.

(iii) Relative Location of the User's Eye with Respect to the Semi-Reflective Surface:

The user's eye location is tracked using the tracker. The tracked eye location is used to compute a viewing angle and to determine how light needs to be reflected to reach the user's eye.

The iterative search can be performed as follows:

Step 1: Initial Guess for the Reflection Point

The search starts from an estimated location on the semi-reflective surface, which is aligned with a predefined location of the light-emitting surface. Most importantly, the estimated location is selected such that the search does not begin in an invalid location. As an example, the predefined location can be selected as a centre of the light-emitting surface.

Step 2: Forward Function Computation

For each iteration, the following calculations can be performed:

(2a) Sampling the Semi-Reflective Surface:

The curvature model (for example, the heightfield or the mesh-based model) is queried to obtain a surface normal at the estimated location on the semi-reflective surface and a distance of the light-emitting surface from the estimated location.

Continuing from the previous example, the surface normal and the distance can be determined from the four components of the heightfield. It will be appreciated that the iterative search can alternatively be performed in other reference coordinate systems. As an example, if the curvature of the semi-reflective surface is expressed as a $f(x,y) \Rightarrow z$ in a given space, the iterative search can be performed directly on the semi-reflective surface, as long as gradients can be traced back to the coordinates of the light-emitting surface.

(2b) Tracing the Light Ray:

An incident ray direction is computed from the given region of the light-emitting surface to the estimated location on the semi-reflective surface. Using the law of reflection, a reflected ray direction is calculated.

(2c) Intersection with the Eye Position:

It is then determined whether the reflected ray intersects with the user's eye. If the reflected ray intersects with the location of the given eye, the search is considered to converge to a valid reflection portion.

Step 3: Refining the Search

If the initial guess does not yield the correct intersection, the estimated location is iteratively adjusted using an iterative search algorithm until a correct intersection is found or a maximum iteration count is reached.

4. When the correct intersection is found (namely, when the corresponding reflection portion of the semi-reflective surface is found), the viewing direction from the given eye towards the corresponding reflection portion of the semi-reflective surface is determined by computing a vector from the user's eye location to the identified reflection portion on the semi-reflective surface.

Next, the corresponding pixel location in the input image is determined by projecting the viewing direction onto the imaginary image plane, using the relative pose of the imaginary image plane with respect to the given eye. This can be achieved by transforming the vector into the image plane's coordinate system using a view-projection matrix, followed by a perspective division to obtain normalized 2D coordinates within the input image. These coordinates can be then mapped to a nearest corresponding pixel in the input image.

Finally, the colour values of the corresponding pixel are fetched and utilised for generating an output image, ensuring that the displayed content correctly aligns with the viewer's perspective.

In this way, the system performs iterative searches for multiple regions of the light-emitting surface, finding corresponding reflection portions on the semi-reflective surface for each region. For each reflection portion, the system determines a corresponding viewing direction from the given eye, which is then used to determine the correct pixel locations in the input image. The system then fetches the colour values of these corresponding pixels and utilises them to generate the output image, ensuring that when displayed via the display unit, presents an image that appears undistorted and correctly aligned to the given eye's perspective.

The aforementioned steps have been recited with respect to the given eye. It will be appreciated that these steps can be performed similarly for each eye of each individual one of the at least one user. This applies well to both: a 2D display unit that displays a single image to all the users, as well as a 3D display unit that displays different images to each eye of each user.

Notably, the disclosed system and method are not limited to standard 2D display units but are also applicable to light field display units, which generate a synthetic light field to present 3D visual scenes. The system is scalable for multi-user scenarios and autostereoscopic applications, as it can individually compute reflection mappings and colour adjustments for each eye, ensuring binocular image fusion. The ability to dynamically adjust the output image based on real-time eye tracking makes this system well-suited for adaptive AR experiences, driver assistance systems, and next-generation HUDs.

Optionally, in this regard, the display unit is a light field display unit comprising a multiscopic optical element, wherein the at least one processor is configured to:
when the corresponding reflection portion of the semi-reflective surface is found during the iterative search, determine a ray direction of the light rays emanating from the given region of the light-emitting surface towards the corresponding reflection portion of the semi-reflective surface; and
control the multiscopic optical element, based on the ray direction.

To enable the determination of the ray direction of the light rays emanating from the given region of the light-emitting surface towards the corresponding reflection portion of the semi-reflective surface, the at least one processor could be configured to utilize precise optical modelling. Optionally, in this regard, the at least one processor is configured to determine the ray direction of the light rays (namely, a trajectory of the light rays) based on the relative location of the semi-reflective surface with respect to the light-emitting surface, the position of the corresponding reflection portion on the semi-reflective surface, and a position of the given region on the light-emitting surface. Once the ray direction is determined, the system dynamically controls the multiscopic optical element to allow the light rays to propagate along the ray direction. This optimizes the synthetic light field emitted from the display unit. Controlling multiscopic optical elements is well-known in the art.

Employing the light field display unit comprising the multiscopic optical element in the system introduces several key technical advantages, particularly in applications requiring advanced depth perception, autostereoscopic imaging, and adaptive optical control.

First, by determining the ray direction of the light rays emanating from the given region and controlling the multiscopic optical element accordingly, the system enhances image fidelity, viewing flexibility, and depth representation.

Second, precise ray control ensures that light rays reflect off the optical combiner at correct angles, allowing the user to perceive a distortion-free, correctly aligned 3D scene. This is particularly beneficial in automotive HUDs, AR applications, and immersive displays, where accurate parallax-based depth perception is essential.

Third, the at least one processor could be configured to adjust the ray directions of light rays across different regions of the light-emitting surface, based on the relative location of the eyes of the at least one user and the curvature of the semi-reflective surface. This enables multi-user adaptability, enabling different viewers to see separate, perspective-corrected images without the need for physical realignment of the display. This is crucial for HUDs in vehicles, where both the driver and passengers may have different viewing angles.

Fourth, by precisely computing the ray direction for each display region and dynamically controlling the multiscopic optical element, the system ensures clearer, more accurate image projections that maintain sharpness and visual coherence even at oblique viewing angles, reducing distortions and artefacts.

Moreover, optionally, the at least one processor is configured to:
when the corresponding reflection portion of the semi-reflective surface is not found during the iterative search,
utilise colour values corresponding to a black colour to display the colour at the given region of the light-emitting surface.

The feature of displaying the black colour when the iterative search fails to find a valid reflection portion on the semi-reflective surface provides several key technical benefits related to image quality, computational efficiency, and visual consistency in AR systems, particularly in HUDs and automotive AR applications.

First, where a valid reflection portion is unavailable, utilising the black colour allows to generate the output image that ensures a clean, distortion-free AR visualization, maintaining a sharp and legible display. This prevents visual clutter and enhances clarity, allowing the user to focus on relevant AR content.

Second, rendering the black colour optimizes the accuracy of displayed reflections, ensuring that only correctly mapped image regions are presented to the user. This prevents any introduction of erroneous visual cues, ensuring that only accurate reflections are shown to the viewer Third, by implementing a predefined maximum iteration count, the system efficiently manages processing time while maintaining smooth and responsive performance. Displaying the black colour in cases where a reflection portion cannot be determined ensures that the system prioritizes computational efficiency without unnecessary processing delays.

Fourth, as mentioned earlier, at certain angles or extreme edges of the optical combiner, reflections may become degenerate—where a single display region maps to multiple reflection portions or does not appear at all. In these cases, rendering the black colour provides a visually neutral fallback, preventing unnatural stretching, flickering, or visual inconsistencies along the display boundaries.

Fifth, in automotive HUDs, rendering the black colour enhances visual separation between AR elements and the real-world environment, contributing to greater user focus and improved situational awareness. By maintaining a structured and organized display, the system supports safe and distraction-free driving experiences.

Sixth, in transparent displays and adaptive brightness systems, black regions create a natural blending effect, ensuring a smooth and unobtrusive visual transition. This enables better depth perception and a more immersive AR experience, allowing digital content to integrate seamlessly with the user's field of view.

Furthermore, optionally, the at least one processor is configured to:
- divide the light-emitting surface of the display unit into a grid; and
- consider a plurality of grid vertices of the grid as a plurality of regions of the light-emitting surface,
wherein the given region of the light-emitting surface is selected from amongst the plurality of regions of the light-emitting surface.

As an example, the grid may be defined by horizontal lines and vertical lines (aligned with an X-axis and a Y-axis of the light-emitting surface, respectively). In such a case, intersections of the horizontal lines and the vertical lines form grid vertices. As another example, the grid may be defined as a triangular grid. In such a case, vertices of triangles in the grid form grid vertices.

The grid-based division of the light-emitting surface introduces several key technical advantages that enhance computational efficiency, optimize rendering performance, and maintain high visual accuracy in AR and HUD applications. By dividing the light-emitting surface into a structured grid and processing the plurality of grid vertices instead of each individual pixel, the system achieves a more efficient and scalable approach to distortion correction and image rendering.

First, instead of performing intensive iterative search calculations for every pixel, only a limited set of grid vertices are processed, significantly reducing the computational burden. The results from these grid vertices can then be interpolated across the grid, achieving nearly the same level of accuracy while using far fewer computational resources. Optionally, in this regard, the at least one processor is configured to:
- interpolate between a first pixel location and a second pixel location in the input image that are determined for a first region and a second region of the light-emitting surface, to estimate at least one intermediate pixel location in the input image for at least one intermediate region of the light-emitting surface, wherein the at least one intermediate region lies between the first region and the second region;
- for the at least one intermediate pixel location in the input image, fetch colour values of at least one corresponding pixel in the input image; and
- utilise the colour values of the at least one corresponding pixel in the input image to display colour at the at least one intermediate region of the light-emitting surface of the display unit.

Hereinabove, the first region and the second region are adjacent to each other. The aforementioned approach is particularly beneficial for real-time AR applications, where maintaining a high frame rate and low latency is critical.

Second, by performing iterative search calculations at grid vertices, the system efficiently corrects for the curvature of the semi-reflective surface without requiring an excessive number of computations. The interpolated results ensure that the displayed image remains undistorted across the entire display surface while maintaining smooth spatial transitions between regions.

Third, by using a grid-based approach, the system scales efficiently, ensuring that even high-resolution displays can be processed in real time without overwhelming the computational hardware. This makes the system highly adaptable for next-generation AR HUDs, automotive displays, and immersive AR environments.

Fourth, processing only grid vertices reduces the amount of data that needs to be stored and transferred, optimizing both memory usage and processing bandwidth. This is particularly valuable for embedded AR systems and automotive HUDs, where memory and processing constraints are more stringent.

Fifth, the grid resolution can be dynamically adjusted based on available processing power and display complexity. Optionally, in this regard, the at least one processor is configured to adjust a resolution of the grid and, optionally, a maximum number of iteration steps to be employed during the iterative search, based on at least one computing resource parameter of the system. The at least one computing resource parameter could be at least one of: CPU (central processing unit) Processing Load, GPU (graphical processing unit) Utilization, available memory (RAM or VRAM), power consumption. In high computing load scenarios, the grid resolution can be reduced to prioritize real-time performance, while in lower-load conditions, a finer grid (namely, a higher resolution grid) can be used to enhance visual fidelity. This adaptive approach ensures a consistent user experience regardless of system workload.

Sixth, the grid-based approach works effectively with real-time eye tracking, allowing the system to prioritize rendering in areas where the user is looking while reducing processing for peripheral regions. Optionally, in this regard, the at least one processor is configured to:
- determine a gaze direction of the given eye, by utilising the tracker;
- determine a gaze portion of the semi-reflective surface through which the gaze of the given eye passes, based on the gaze direction of the given eye and the relative location of the given eye with respect to the semi-reflective surface;

estimate a corresponding gaze portion of the light-emitting surface whose light rays are incident upon the gaze portion of the semi-reflective surface and reflected towards the given eye, based on a curvature of the gaze portion of the semi-reflective surface, the relative location of the semi-reflective surface with respect to the light-emitting surface, the relative location of the given eye with respect to the semi-reflective surface, a position of the gaze portion on the semi-reflective surface and a position of the gaze portion on the light-emitting surface; and adjust a resolution of the grid in the corresponding gaze portion of the light-emitting surface to be higher than a resolution of the grid in a remaining portion of the light-emitting surface.

This enables efficient foveated rendering, further enhancing computational efficiency and user experience.

Moreover, the iterative search used to find the correct reflection portion on the semi-reflective surface can be implemented using various optimization techniques, each offering different trade-offs in terms of computational efficiency, convergence speed, and robustness to complex surfaces. In one implementation, the iterative search can be performed using a gradient descent algorithm. In the gradient descent algorithm, the search iteratively updates an estimated location of the reflection portion by following a gradient of an error function. In another implementation, the iterative search can be performed using Adam (Adaptive Moment Estimation). Adam improves upon standard gradient descent by incorporating adaptive learning rates and momentum, allowing for faster convergence and better stability in cases where the curvature of the semi-reflective surface varies significantly. In yet another implementation, the iterative search can be performed using Newton's algorithm or quasi-Newton algorithms, for example, such as the Broyden-Fletcher-Goldfarb-Shanno (BFGS) algorithm. These algorithms leverage second-order derivatives (or approximations thereof) to accelerate convergence, making them useful when computational resources allow. The choice of the iterative search algorithm depends on the specific system constraints, including real-time processing requirements, the complexity of the optical combiner's curvature, and the level of accuracy.

For illustration purposes only, there will now be described how the gradient descent algorithm can be used to refine the search. If the initial guess (namely, the estimated location on the semi-reflective surface) does not yield the correct intersection with the given eye, the system iteratively adjusts the guess as follows:

Step I: Compute the Error Vector

An intersection point at which the reflected ray intersects with a plane on which the user's eye lies is determined. An error is computed as a difference between the determined intersection point and an actual location of the given eye on the plane.

A gradient of the error function is computed to determine how to update the guessed location (namely, the estimated location).

Step II: Update the Reflection Guess

The guess is adjusted along the gradient direction to minimize the error. A step-size multiplier is used to control convergence speed and stability.

Step III: Convergence Check:

The process repeats until the error falls below a predefined threshold error or a maximum iteration count is reached. The predefined threshold error may, for example, lie in a range of 1 mm to 5 mm. The maximum iteration count may, for example, lie in a range of 10 to 50 iterations. As an example, the predefined threshold error can be selected as 2 mm, and the maximum iteration count can be selected as 40 iterations.

In experiments, it was found that the gradient descent algorithm is particularly well-suited for the iterative search, due to its fast convergence, computational efficiency, and robustness in smooth, non-bijective mappings. The primary technical advantage of gradient descent in this system is its ability to iteratively refine estimates for the reflection portion, ensuring precise mapping between display regions and their reflected portions in the user's field of view. Unlike global optimization methods, which may require extensive computation, gradient descent allows for a localized, rapid search by following the gradient of the error function, leading to efficient real-time correction of optical distortions.

Additionally, the curvature of the semi-reflective surface is generally smooth, meaning there are minimal false local minima that could mislead the optimization process. This makes gradient descent an optimal choice, as it can rapidly converge to an accurate solution without the risk of getting trapped in incorrect solutions. The use of gradient-based updates ensures that the algorithm quickly finds the correct reflection portion with minimal iterations, reducing computational overhead while maintaining high accuracy.

Moreover, gradient descent is scalable, making it well-suited for grid-based implementations, where the search is performed only at grid vertices, and the results are interpolated across intermediate regions. This dramatically reduces the number of calculations required per frame, making the system suitable for real-time applications such as AR HUDs and automotive display systems. The ability to dynamically adjust parameters such as step size, error tolerance, and iteration count ensures a flexible balance between computational performance and correction accuracy, adapting to available processing power.

Furthermore, optionally, the at least one processor is configured to:

predict a future relative location of the given eye of the individual one of the at least one user with respect to the semi-reflective surface of the optical combiner, by utilising the tracker;

perform another iterative search to find future reflection locations of edges of the light-emitting surface of the display unit on the semi-reflective surface of the optical combiner, based on the curvature of the semi-reflective surface, the relative location of the semi-reflective surface with respect to the light-emitting surface, and the future relative location of the given eye with respect to the semi-reflective surface;

generate a view frustum inside which the future reflection locations of the edges of the light-emitting surface fit, based on the future relative location of the given eye with respect to the semi-reflective surface; and generate or retrieve a future input image to be presented to the given eye, based on the view frustum.

Optionally, the view frustum includes a buffer zone that extends beyond the future reflection locations of the edges of the light-emitting surface. This enables to accommodate unexpected head movements of the at least one user.

Predicting the future relative location of the user's eye and precomputing reflection locations on the semi-reflective surface introduces several key technical advantages that enhance image stability, real-time responsiveness, and rendering efficiency in AR displays, HUDs, and dynamic optical systems.

First, by predicting the future relative location of the user's eye, the system can proactively adjust display content before the user moves significantly. This reduces latency and visible display lag, ensuring that AR content remains stable and correctly aligned in the user's field of view, even during rapid head movements.

Second, instead of reactively recalculating reflection points when the user moves, the system performs the another iterative search to precompute future reflection locations of the edges of the display on the semi-reflective surface. This allows the system to anticipate optical distortions and make necessary corrections before they become noticeable, ensuring a seamless viewing experience.

Third, the view frustum defines the field of view of the input image by ensuring that all precomputed reflection locations of the light-emitting surface fit within a well-defined projection space. This optimization ensures that only the relevant portion of the input image is generated or retrieved, minimizing computational overhead. By dynamically adjusting the view frustum based on the predicted eye position, the system ensures that the generated image is always correctly mapped, improving image accuracy and realism.

Fourth, with a precomputed view frustum, the system can generate or retrieve a future input image that already accounts for optical distortions and viewing transformations. This significantly reduces the need for on-the-fly reprojection and ensures that the rendering pipeline remains efficient, maintaining high frame rates and smooth AR experiences.

Fifth, by anticipating eye movement and adjusting the input image dynamically, the system prevents visual artifacts, motion blur, and tracking inconsistencies. This is particularly beneficial in automotive HUDs, where users frequently shift their gaze, and in AR glasses, where eye-tracked content must remain anchored in the real world.

Sixth, since the system precomputes reflection locations and adjusts the input image based on a defined view frustum, it eliminates unnecessary processing of out-of-view regions. This results in optimized GPU and CPU utilization, enabling real-time rendering even on resource-constrained hardware.

Seventh, such a predictive approach can be extended to support multiple users, where each user's future viewing frustum is computed independently. This makes it highly effective for multi-viewer automotive HUDs, collaborative AR experiences, and dynamic display environments. For illustration purposes, there will now be described how various components of the system can be implemented. Various embodiments of the present disclosure will now be described with reference to implementations using light field display units and light field images. However, a person skilled in the art would recognize corresponding implementations using regular display units and 2D images that are much simpler than the implementations using light field display units and light field images.

The at least one processor of the system controls an overall operation of the system, and is communicably coupled to the tracker and the display unit. Optionally, the at least one processor of the system is implemented as a processor of the display unit. Alternatively, optionally, the at least one processor of the system is implemented as a processor of a computing device that is communicably coupled to the display unit. Examples of the computing device include, but are not limited to, a laptop, a desktop, a tablet, a phablet, a personal digital assistant, a workstation, and a console. Yet alternatively, optionally, the at least one processor of the system is implemented as a cloud server (namely, a remote server) that provides a cloud computing service.

Throughout the present disclosure, the term "tracker" refers to specialised equipment for detecting and/or following a location of eyes of a given user. The given user encompasses each individual one of the at least one user. Optionally, the tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracker. When different types of images captured by the various different types of tracking cameras are utilised, a location of the user's eyes can be determined highly accurately, as results obtained from one type of image can be used to refine results obtained from another type of image. Herein, these different types of images constitute tracking data collected by the tracker, and may be in the form of at least one of: visible-light images, IR images, depth images. It will be appreciated that the tracker tracks the eyes of the given user with a significantly high accuracy and precision, such that an error in determining the relative location may, for example, be minimised to within a tolerance range of approximately (+/−) 8 millimetres.

As mentioned earlier, the input image is generated or retrieved based on the relative pose of the imaginary image plane with respect to the given eye. In case of the light field display unit, separate input images are generated or retrieved for different eyes of each individual one of the at least one user. A light field image is generated from these separate input images. The light field image may be understood to be a 2D image comprising a plurality of pixels, wherein a first set of pixels from amongst the plurality of pixels is responsible for generating a first part of the synthetic light field that corresponds to a first eye of the at least one user, and a second set of pixels from amongst the plurality of pixels is responsible for generating a second part of the synthetic light field that corresponds to a second eye of the at least one user. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user.

In some implementations, the at least one processor of the system is configured to generate the input image by employing a 3D model of at least one virtual object. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the input image in a form of a 2D user interface (UI) element. The 2D UI element could pertain to, for example, a virtual navigation tool, a virtual gadget, a virtual message, a virtual entity, a virtual entertainment media, a virtual information, or similar.

In some implementations, the multiscopic optical element can be implemented as a part of the display unit. In other implementations, the multiscopic optical element can be implemented as a separate element. Irrespective of whether the multiscopic optical element is implemented as a part of the display unit or as a separate element, the multiscopic optical element can be implemented as a controllable lenticular array, a controllable parallax barrier, or similar. The controllable parallax barrier can be implemented as any one of: a switchable liquid crystal (LC) shutter array, a switchable LC barrier, a transparent/diffuse switchable film (for example, made of a polymer-dispersed liquid crystal (PDLC)). Controlling such multiscopic optical elements is well-known in the art.

Moreover, the optical combiner can be implemented as at least a part of a windshield or other windows of a vehicle. By "at least a part", it is meant that the optical combiner can also be implemented as an entirety of the windshield or the other windows. This allows the system to be implemented as an HUD in the vehicle. The optical combiner could be implemented as at least one of: a lens, a mirror, a semi-transparent mirror, a semi-transparent film, a semi-transparent flexible membrane, a prism, a beam splitter, an optical waveguide, a polarizer. Optionally, a tilt angle of the optical combiner with respect to the image plane of the display unit lies in a range of 10 degrees and 75 degrees.

The present disclosure also relates to the method as described above. Various embodiments and variants disclosed above, with respect to the aforementioned first aspect, apply mutatis mutandis to the method.

Optionally, in the method, the iterative search is performed using a gradient descent algorithm. The primary technical advantage of gradient descent in this method is its ability to iteratively refine estimates for the reflection portion, ensuring precise mapping between display regions and their reflected portions in the user's field of view.

Optionally, the method further comprises when the corresponding reflection portion of the semi-reflective surface is not found during the iterative search, utilising colour values corresponding to a black colour to display the colour at the given region of the light-emitting surface. The feature of displaying the black colour when the iterative search fails to find a valid reflection portion on the semi-reflective surface provides several key technical benefits related to image quality, computational efficiency, and visual consistency in AR systems, particularly in HUDs and automotive AR applications, as described in detail earlier.

Moreover, optionally, the display unit is a light field display unit comprising a multiscopic optical element, wherein the method further comprises:
  when the corresponding reflection portion of the semi-reflective surface is found during the iterative search,
    determining a ray direction of the light rays emanating from the given region of the light-emitting surface towards the corresponding reflection portion of the semi-reflective surface; and
    controlling the multiscopic optical element, based on the ray direction.

Employing the light field display unit comprising the multiscopic optical element in the method introduces several key technical advantages, particularly in applications requiring advanced depth perception, autostereoscopic imaging, and adaptive optical control, as described in detail earlier.

Furthermore, optionally, the method further comprises:
  dividing the light-emitting surface of the display unit into a grid; and
  considering a plurality of grid vertices of the grid as a plurality of regions of the light-emitting surface,
  wherein the given region of the light-emitting surface is selected from amongst the plurality of regions of the light-emitting surface.

The grid-based division of the light-emitting surface introduces several key technical advantages that enhance computational efficiency, optimize rendering performance, and maintain high visual accuracy in AR and HUD applications, as described in detail earlier. By dividing the light-emitting surface into a structured grid and processing the plurality of grid vertices instead of each individual pixel, the system achieves a more efficient and scalable approach to distortion correction and image rendering.

Optionally, in this regard, the method further comprises:
  interpolating between a first pixel location and a second pixel location in the input image that are determined for a first region and a second region of the light-emitting surface, to estimate at least one intermediate pixel location in the input image for at least one intermediate region of the light-emitting surface, wherein the at least one intermediate region lies between the first region and the second region;
  for the at least one intermediate pixel location in the input image, fetching colour values of at least one corresponding pixel in the input image; and
  utilising the colour values of the at least one corresponding pixel in the input image to display colour at the at least one intermediate region of the light-emitting surface of the display unit.

Additionally, optionally, the method further comprises adjusting a resolution of the grid and, optionally, a maximum number of iteration steps to be employed during the iterative search, based on at least one computing resource parameter of the system.

Moreover, optionally, the method further comprises:
determining a gaze direction of the given eye, by utilising the tracker;
determining a gaze portion of the semi-reflective surface through which the gaze of the given eye passes, based on the gaze direction of the given eye and the relative location of the given eye with respect to the semi-reflective surface;
estimating a corresponding gaze portion of the light-emitting surface whose light rays are incident upon the gaze portion of the semi-reflective surface and reflected towards the given eye, based on a curvature of the gaze portion of the semi-reflective surface, the relative location of the semi-reflective surface with respect to the light-emitting surface, the relative location of the given eye with respect to the semi-reflective surface, a position of the gaze portion on the semi-reflective surface and a position of the gaze portion on the light-emitting surface; and
adjusting a resolution of the grid in the corresponding gaze portion of the light-emitting surface to be higher than a resolution of the grid in a remaining portion of the light-emitting surface.

This enables efficient foveated rendering, further enhancing computational efficiency and user experience.

Furthermore, optionally, the method further comprises:
predicting a future relative location of the given eye of the individual one of the at least one user with respect to the semi-reflective surface of the optical combiner, by utilising the tracker;
performing another iterative search to find future reflection locations of edges of the light-emitting surface of the display unit on the semi-reflective surface of the optical combiner, based on the curvature of the semi-reflective surface, the relative location of the semi-reflective surface with respect to the light-emitting surface, and the future relative location of the given eye with respect to the semi-reflective surface;
generating a view frustum inside which the future reflection locations of the edges of the light-emitting surface fit, based on the future relative location of the given eye with respect to the semi-reflective surface; and
generating or retrieving a future input image to be presented to the given eye, based on the view frustum.

Predicting the future relative location of the user's eye and precomputing reflection locations on the semi-reflective surface introduces several key technical advantages that enhance image stability, real-time responsiveness, and rendering efficiency in AR displays, HUDs, and dynamic optical systems, as described in detail earlier.

DETAILED DESCRIPTION OF THE DRAWINGS

Referring to FIGS. 1A-1D, illustrated is an example implementation of a system 100 incorporating compensation for an optical combiner's curvature, in accordance with an embodiment of the present disclosure. The system 100 comprises a tracker 102, a display unit 104, an optical combiner 106 and at least one processor, depicted as a processor 108. The optical combiner 106 is arranged on an optical path of the display unit 104. A semi-reflective surface 110 of the optical combiner 106 is curved. The processor 108 is configured to:
determine a relative location of eyes of at least one user with respect to the semi-reflective surface 110 of the optical combiner 106, by utilising the tracker 102;
determine a relative pose of an imaginary image plane 112 on which an input image is to be presented with respect to a given eye of an individual one of the at least one user, based on a relative location of the given eye with respect to the semi-reflective surface 110;
generate or retrieve the input image to be presented to the given eye, based on the relative pose of the imaginary image plane 112 with respect to the given eye;
for a given region 114 of a light-emitting surface 116 of the display unit 104, perform an iterative search to find a corresponding reflection portion 118 of the semi-reflective surface 110 where light rays emanating from the given region 114 are incident and from which the light rays reflect towards the given eye, based on a curvature of the semi-reflective surface 110, a relative location of the semi-reflective surface 110 with respect to the light-emitting surface 116, and the relative location of the given eye with respect to the semi-reflective surface 110; and
when the corresponding reflection portion 118 of the semi-reflective surface 110 is found during the iterative search,
determine a viewing direction from the given eye towards the corresponding reflection portion 118 of the semi-reflective surface 110, based on the relative location of the given eye with respect to the semi-reflective surface 110 and a position of the corresponding reflection portion 118 on the semi-reflective surface 110;
determine a corresponding pixel location in the input image, based on the viewing direction from the given eye towards the corresponding reflection portion 118 of the semi-reflective surface 110 and the relative pose of the imaginary image plane 112 with respect to the given eye;
for the corresponding pixel location in the input image, fetch colour values of a corresponding pixel in the input image; and
utilise the colour values of the corresponding pixel in the input image to display colour at the given region 114 of the light-emitting surface 116 of the display unit 104.

Optionally, the light-emitting surface 116 is divided into a grid, and the iterative search is performed for regions of the light-emitting surface 116 that correspond to grid vertices of the grid. With reference to FIG. 1B, the iterative search is shown to be performed on vertices of a 4×4 grid, for illustration purposes only. The grid can alternatively be in a form of a triangular grid or any other type of polyhedral grid. With reference to FIGS. 1C and 1D, the grid is shown to be mapped to a corresponding grid on the semi-reflective surface 110, wherein the grid is shown as a triangular grid, for illustration purposes only.

Figure 1A:
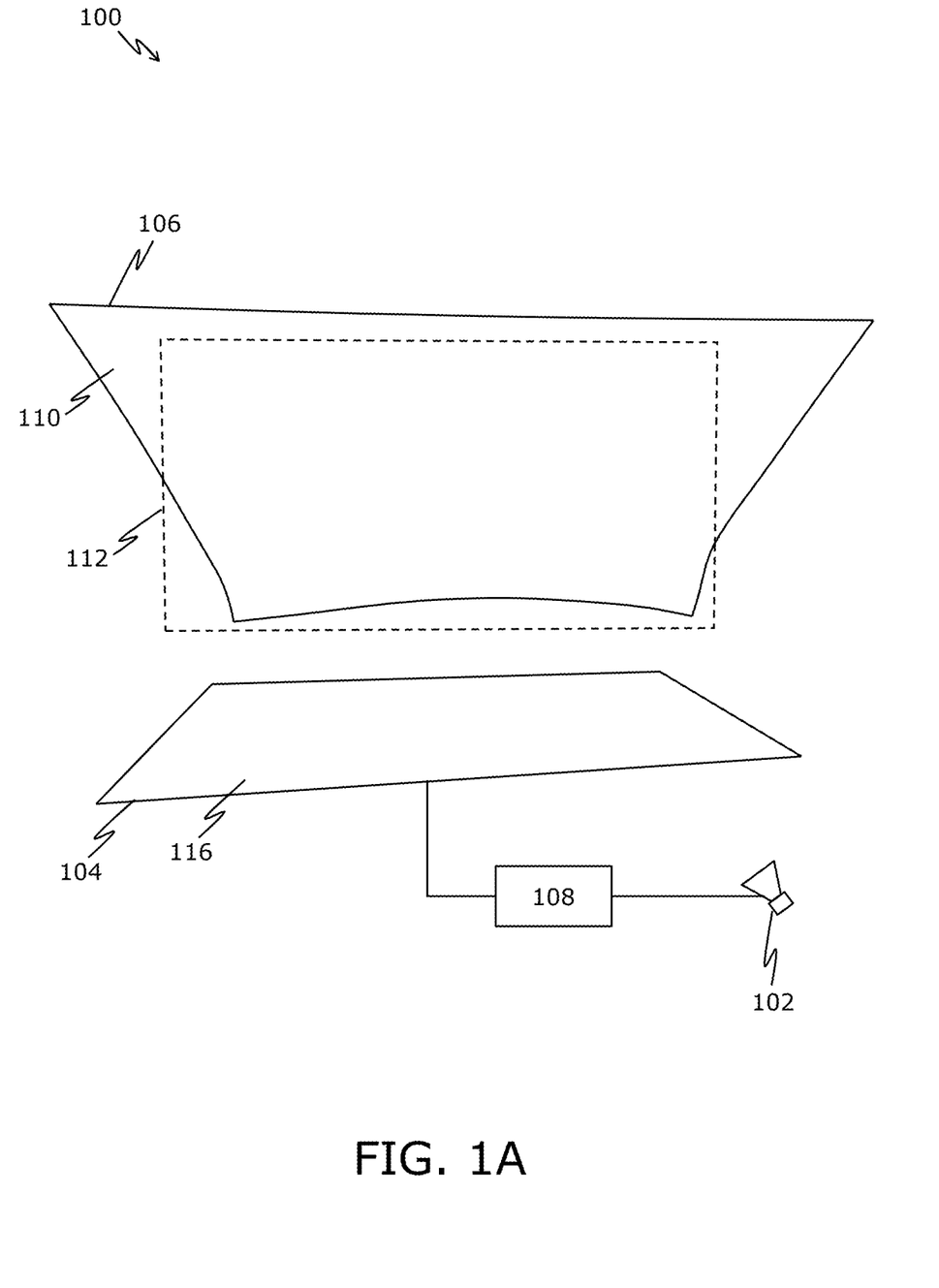
FIGS. 1A-1D depict a system incorporating compensation of an optical combiner's curvature, in accordance with an embodiment of the present disclosure.
Figure 1B:
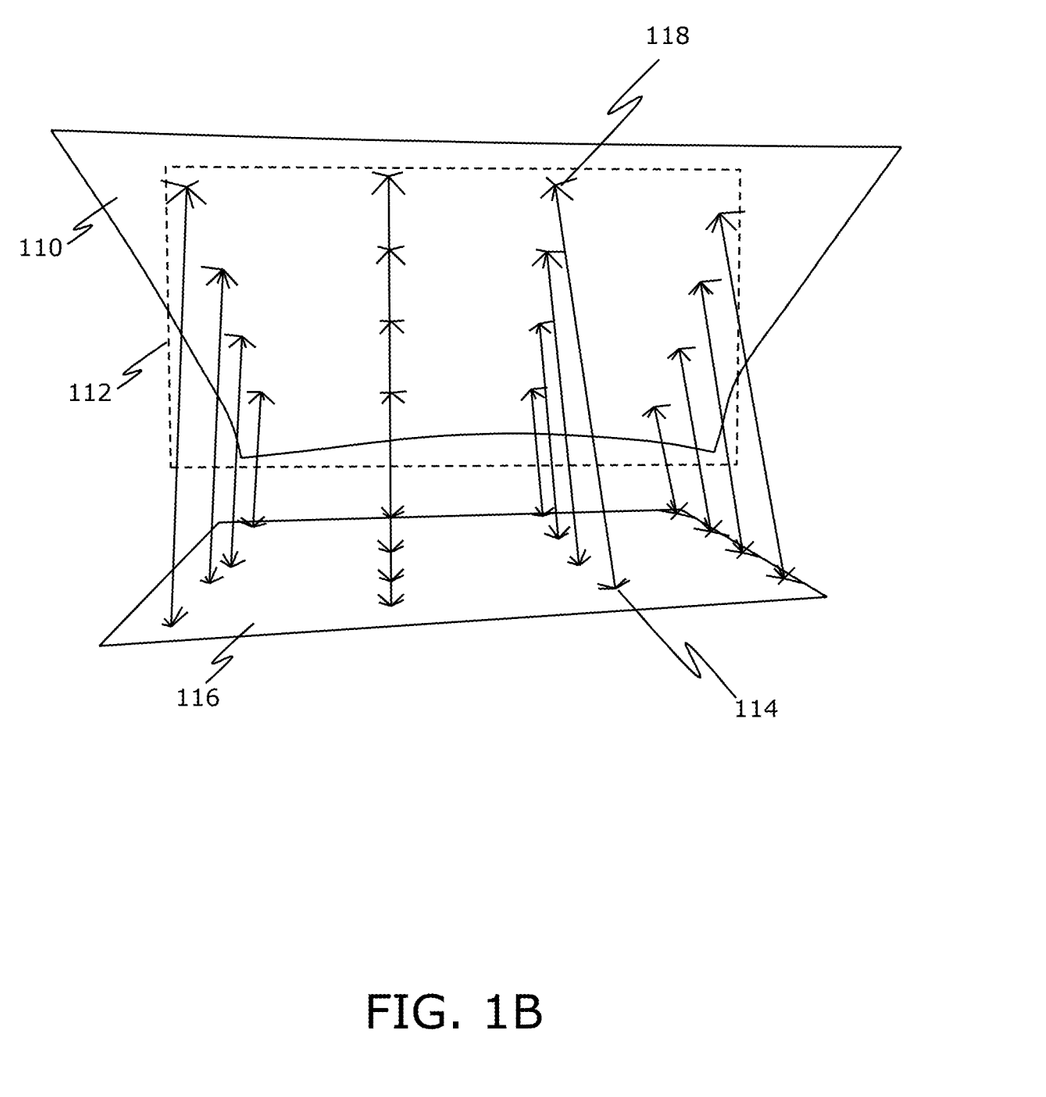
Figure 1C:
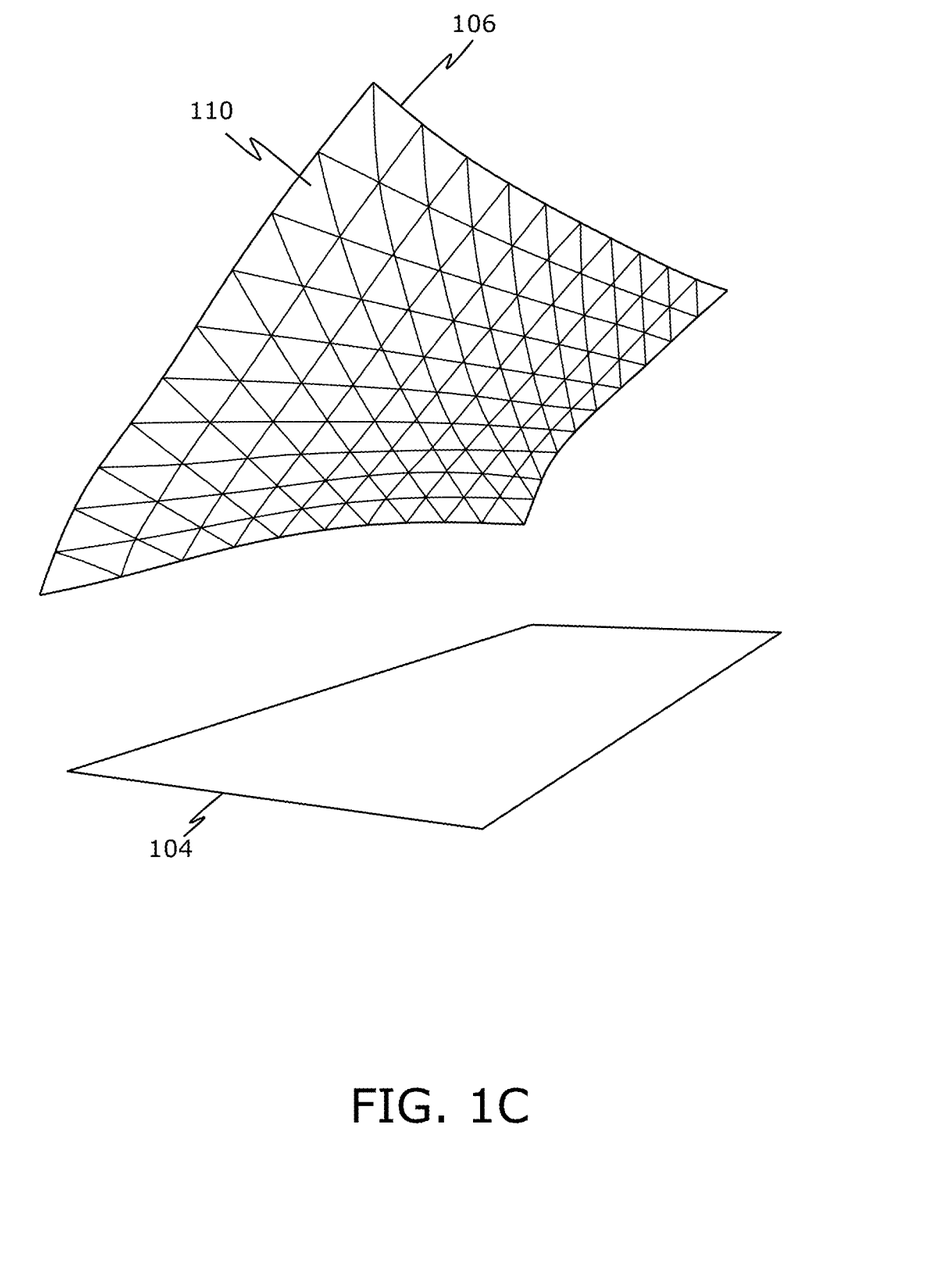
Figure 1D:
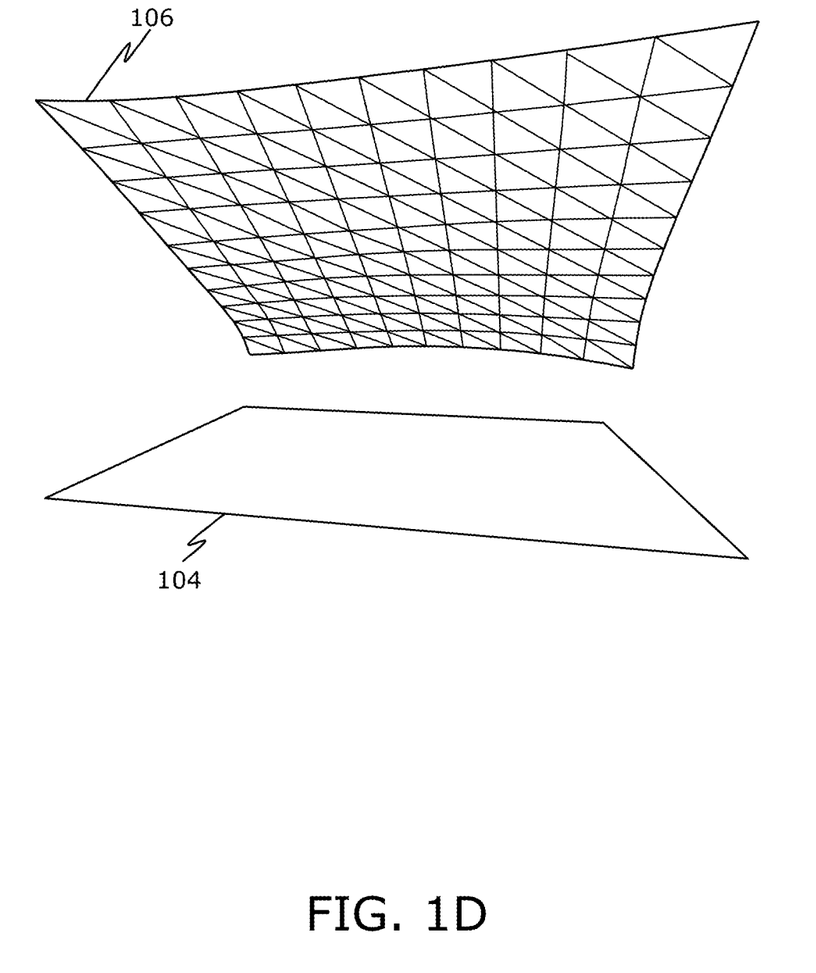

FIGS. 1A and 1B depict the system 100 from a perspective of the given eye, for illustration purposes. It may be understood by a person skilled in the art that FIGS. 1A-1D include simplified example implementations of the system 100, for sake of clarity, which should not unduly limit the scope of the claims herein. It is to be understood that the specific implementation of the system 100 is not to be construed as limiting it to specific numbers or types of trackers, display units, optical combiners and processors. The person skilled in the art will recognize many variations, alternatives, and modifications of embodiments of the present disclosure.

Figure 2:
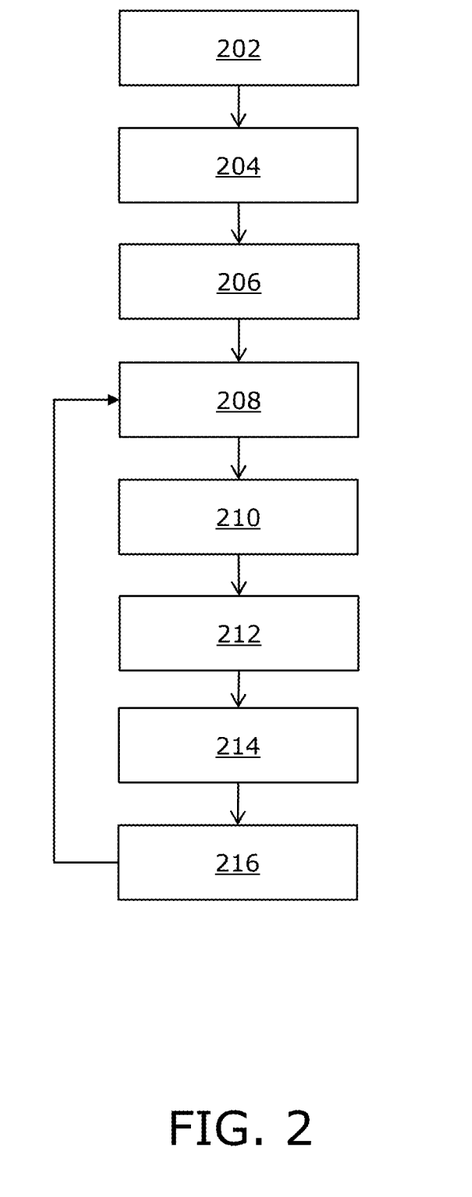
FIG. 2 depicts steps of a method incorporating compensation of an optical combiner's curvature, in accordance with an embodiment of the present disclosure.

Referring to FIG. 2, illustrated are steps of a method incorporating compensation of an optical combiner's curvature, in accordance with an embodiment of the present disclosure. At step 202, a relative location of eyes of at least one user with respect to a semi-reflective surface of an optical combiner is determined. The optical combiner is arranged on an optical path of a display unit. At step 204, a relative pose of an imaginary image plane on which an input image is to be presented with respect to a given eye of an individual one of the at least one user is determined, based on a relative location of the given eye with respect to the semi-reflective surface. At step 206, the input image to be presented to the given eye is generated or retrieved, based on the relative pose of the imaginary image plane with respect to the given eye. At step 208, for a given region of a light-emitting surface of the display unit, an iterative search is performed to find a corresponding reflection portion of the semi-reflective surface where light rays emanating from the given region of the light-emitting surface are incident and from which the light rays reflect towards the given eye, based on a curvature of the semi-reflective surface, a relative location of the semi-reflective surface with respect to the light-emitting surface, and the relative location of the given eye with respect to the semi-reflective surface.

When the corresponding reflection portion of the semi-reflective surface is found during the iterative search, steps 210, 212, 214 and 216 are performed. At step 210, a viewing direction from the given eye towards the corresponding reflection portion of the semi-reflective surface of the optical combiner is determined, based on the relative location of the given eye with respect to the semi-reflective surface and a position of the corresponding reflection portion on the semi-reflective surface. At step 212, a corresponding pixel location in the input image is determined, based on the viewing direction from the given eye towards the corresponding reflection portion of the semi-reflective surface and the relative pose of the imaginary image plane with respect to the given eye. At step 214, for the corresponding pixel location in the input image, colour values of a corresponding pixel in the input image are fetched. At step 216, the colour values of the corresponding pixel in the input image are utilised to display colour at the given region of the light-emitting surface of the display unit. Steps 208, 210, 212, 214 and 216 are repeated for different regions of the light-emitting surface.

The aforementioned steps are only illustrative and other alternatives can also be provided where one or more steps are added, without departing from the scope of the claims herein.

The invention claimed is:

1. A system comprising:
    a tracker;
    a display unit;
    an optical combiner arranged on an optical path of the display unit, wherein a semi-reflective surface of the optical combiner is curved; and
    at least one processor configured to:
        determine a relative location of eyes of at least one user with respect to the semi-reflective surface of the optical combiner, by utilising the tracker;
        determine a relative pose of an imaginary image plane on which an input image is to be presented with respect to a given eye of an individual one of the at least one user, based on a relative location of the given eye with respect to the semi-reflective surface;
        generate or retrieve the input image to be presented to the given eye, based on the relative pose of the imaginary image plane with respect to the given eye;
        for a given region of a light-emitting surface of the display unit, perform an iterative search to find a corresponding reflection portion of the semi-reflective surface where light rays emanating from the given region of the light-emitting surface are incident and from which the light rays reflect towards the given eye, based on a curvature of the semi-reflective surface, a relative location of the semi-reflective surface with respect to the light-emitting surface, and the relative location of the given eye with respect to the semi-reflective surface; and
        when the corresponding reflection portion of the semi-reflective surface is found during the iterative search,
            determine a viewing direction from the given eye towards the corresponding reflection portion of the semi-reflective surface of the optical combiner, based on the relative location of the given eye with respect to the semi-reflective surface and a position of the corresponding reflection portion on the semi-reflective surface;
            determine a corresponding pixel location in the input image, based on the viewing direction from the given eye towards the corresponding reflection portion of the semi-reflective surface and the relative pose of the imaginary image plane with respect to the given eye;
            for the corresponding pixel location in the input image, fetch colour values of a corresponding pixel in the input image; and
            utilise the colour values of the corresponding pixel in the input image to display colour at the given region of the light-emitting surface of the display unit.

2. The system of claim 1, wherein the iterative search is performed using a gradient descent algorithm.

3. The system of claim 1, wherein the at least one processor is configured to:
    when the corresponding reflection portion of the semi-reflective surface is not found during the iterative search,
        utilise colour values corresponding to a black colour to display the colour at the given region of the light-emitting surface.

4. The system of claim 1, wherein the display unit is a light field display unit comprising a multiscopic optical element, wherein the at least one processor is configured to:
    when the corresponding reflection portion of the semi-reflective surface is found during the iterative search,
        determine a ray direction of the light rays emanating from the given region of the light-emitting surface towards the corresponding reflection portion of the semi-reflective surface; and
        control the multiscopic optical element, based on the ray direction.

5. The system of claim 1, wherein the at least one processor is configured to:
    divide the light-emitting surface of the display unit into a grid; and
    consider a plurality of grid vertices of the grid as a plurality of regions of the light-emitting surface,
    wherein the given region of the light-emitting surface is selected from amongst the plurality of regions of the light-emitting surface.

6. The system of claim 5, wherein the at least one processor is configured to:
- interpolate between a first pixel location and a second pixel location in the input image that are determined for a first region and a second region of the light-emitting surface, to estimate at least one intermediate pixel location in the input image for at least one intermediate region of the light-emitting surface, wherein the at least one intermediate region lies between the first region and the second region;
- for the at least one intermediate pixel location in the input image, fetch colour values of at least one corresponding pixel in the input image; and
- utilise the colour values of the at least one corresponding pixel in the input image to display colour at the at least one intermediate region of the light-emitting surface of the display unit.

7. The system of claim 5, wherein the at least one processor is configured to adjust a resolution of the grid and, optionally, a maximum number of iteration steps to be employed during the iterative search, based on at least one computing resource parameter of the system.

8. The system of claim 5, wherein the at least one processor is configured to:
- determine a gaze direction of the given eye, by utilising the tracker;
- determine a gaze portion of the semi-reflective surface through which the gaze of the given eye passes, based on the gaze direction of the given eye and the relative location of the given eye with respect to the semi-reflective surface;
- estimate a corresponding gaze portion of the light-emitting surface whose light rays are incident upon the gaze portion of the semi-reflective surface and reflected towards the given eye, based on a curvature of the gaze portion of the semi-reflective surface, the relative location of the semi-reflective surface with respect to the light-emitting surface, the relative location of the given eye with respect to the semi-reflective surface, a position of the gaze portion on the semi-reflective surface and a position of the gaze portion on the light-emitting surface; and
- adjust a resolution of the grid in the corresponding gaze portion of the light-emitting surface to be higher than a resolution of the grid in a remaining portion of the light-emitting surface.

9. The system of claim 1, wherein the at least one processor is configured to:
- predict a future relative location of the given eye of the individual one of the at least one user with respect to the semi-reflective surface of the optical combiner, by utilising the tracker;
- perform another iterative search to find future reflection locations of edges of the light-emitting surface of the display unit on the semi-reflective surface of the optical combiner, based on the curvature of the semi-reflective surface, the relative location of the semi-reflective surface with respect to the light-emitting surface, and the future relative location of the given eye with respect to the semi-reflective surface;
- generate a view frustum inside which the future reflection locations of the edges of the light-emitting surface fit, based on the future relative location of the given eye with respect to the semi-reflective surface; and
- generate or retrieve a future input image to be presented to the given eye, based on the view frustum.

10. A method comprising:
- determining a relative location of eyes of at least one user with respect to a semi-reflective surface of an optical combiner, the optical combiner being arranged on an optical path of a display unit;
- determining a relative pose of an imaginary image plane on which an input image is to be presented with respect to a given eye of an individual one of the at least one user, based on a relative location of the given eye with respect to the semi-reflective surface;
- generating or retrieving the input image to be presented to the given eye, based on the relative pose of the imaginary image plane with respect to the given eye;
- for a given region of a light-emitting surface of the display unit, performing an iterative search to find a corresponding reflection portion of the semi-reflective surface where light rays emanating from the given region of the light-emitting surface are incident and from which the light rays reflect towards the given eye, based on a curvature of the semi-reflective surface, a relative location of the semi-reflective surface with respect to the light-emitting surface, and the relative location of the given eye with respect to the semi-reflective surface; and
- when the corresponding reflection portion of the semi-reflective surface is found during the iterative search,
  - determining a viewing direction from the given eye towards the corresponding reflection portion of the semi-reflective surface of the optical combiner, based on the relative location of the given eye with respect to the semi-reflective surface and a position of the corresponding reflection portion on the semi-reflective surface;
  - determining a corresponding pixel location in the input image, based on the viewing direction from the given eye towards the corresponding reflection portion of the semi-reflective surface and the relative pose of the imaginary image plane with respect to the given eye;
  - for the corresponding pixel location in the input image, fetching colour values of a corresponding pixel in the input image; and
  - utilising the colour values of the corresponding pixel in the input image to display colour at the given region of the light-emitting surface of the display unit.

11. The method of claim 10, wherein the iterative search is performed using a gradient descent algorithm.

12. The method of claim 10, further comprising:
- when the corresponding reflection portion of the semi-reflective surface is not found during the iterative search,
  - utilising colour values corresponding to a black colour to display the colour at the given region of the light-emitting surface.

13. The method of claim 10, wherein the display unit is a light field display unit comprising a multiscopic optical element, wherein the method further comprises:
- when the corresponding reflection portion of the semi-reflective surface is found during the iterative search,
  - determining a ray direction of the light rays emanating from the given region of the light-emitting surface towards the corresponding reflection portion of the semi-reflective surface; and
  - controlling the multiscopic optical element, based on the ray direction.

14. The method of claim 10, further comprising:
- dividing the light-emitting surface of the display unit into a grid; and considering a plurality of grid vertices of the grid as a plurality of regions of the light-emitting surface, wherein the given region of the light-emitting surface is selected from amongst the plurality of regions of the light-emitting surface.

15. The method of claim 14, further comprising:

interpolating between a first pixel location and a second pixel location in the input image that are determined for a first region and a second region of the light-emitting surface, to estimate at least one intermediate pixel location in the input image for at least one intermediate region of the light-emitting surface, wherein the at least one intermediate region lies between the first region and the second region;

for the at least one intermediate pixel location in the input image, fetching colour values of at least one corresponding pixel in the input image; and utilising the colour values of the at least one corresponding pixel in the input image to display colour at the at least one intermediate region of the light-emitting surface of the display unit.

16. The method of claim 14, further comprising adjusting a resolution of the grid and, optionally, a maximum number of iteration steps to be employed during the iterative search, based on at least one computing resource parameter of the system.

17. The method of claim 14, further comprising:

determining a gaze direction of the given eye, by utilising the tracker;

determining a gaze portion of the semi-reflective surface through which the gaze of the given eye passes, based on the gaze direction of the given eye and the relative location of the given eye with respect to the semi-reflective surface;

estimating a corresponding gaze portion of the light-emitting surface whose light rays are incident upon the gaze portion of the semi-reflective surface and reflected towards the given eye, based on a curvature of the gaze portion of the semi-reflective surface, the relative location of the semi-reflective surface with respect to the light-emitting surface, the relative location of the given eye with respect to the semi-reflective surface, a position of the gaze portion on the semi-reflective surface and a position of the gaze portion on the light-emitting surface; and adjusting a resolution of the grid in the corresponding gaze portion of the light-emitting surface to be higher than a resolution of the grid in a remaining portion of the light-emitting surface.

18. The method of claim 10, further comprising:

predicting a future relative location of the given eye of the individual one of the at least one user with respect to the semi-reflective surface of the optical combiner, by utilising the tracker;

performing another iterative search to find future reflection locations of edges of the light-emitting surface of the display unit on the semi-reflective surface of the optical combiner, based on the curvature of the semi-reflective surface, the relative location of the semi-reflective surface with respect to the light-emitting surface, and the future relative location of the given eye with respect to the semi-reflective surface;

generating a view frustum inside which the future reflection locations of the edges of the light-emitting surface fit, based on the future relative location of the given eye with respect to the semi-reflective surface; and generating or retrieving a future input image to be presented to the given eye, based on the view frustum.

* * * * *